Oct. 15, 1968          F. E. HILL          3,405,727
              FLUID CONTROL VALVE WITH FEEDBACK
Filed June 29, 1964                     2 Sheets-Sheet 1

INVENTOR.
FRANK E. HILL
BY
*Stephen M. Mihaly*
ATTORNEY

Oct. 15, 1968      F. E. HILL      3,405,727
FLUID CONTROL VALVE WITH FEEDBACK
Filed June 29, 1964      2 Sheets-Sheet 2

INVENTOR.
FRANK E. HILL
BY
ATTORNEY

United States Patent Office 3,405,727
Patented Oct. 15, 1968

3,405,727
FLUID CONTROL VALVE WITH FEEDBACK
Frank E. Hill, Kalamazoo, Mich., assignor to Pneumo
Dynamics Corporation, Cleveland, Ohio, a corporation
of Delaware
Filed June 29, 1964, Ser. No. 378,526
6 Claims. (Cl. 137—83)

The present invention relates as indicated to a feedback for a fluid control valve and relates more particularly to a two-stage control valve having an improved feedback arrangement for accurately maintaining the second stage element in its controlled or adjusted position.

An object of the present invention is to provide a fluid control valve in which a fluid diverter member is adapted to deliver proportional amounts of fluid to a second stage element for controlling the position thereof, with the diverter being associated with a novel feedback means for maintaining the second stage element in its adjusted position.

A further object of the invention is to provide a fluid control valve having a high level of contamination tolerance thereby enhancing valve dependability.

A further object of the present invention is to provide a fluid control valve wherein the transfer of fluid for delivery to the second stage element is in an area relatively remote from the control means for controlling such transfer, with the latter thereby being relatively insensitive to extreme fluid temperature conditions.

A further object of the present invention is to provide a fluid diverter with feedback means characterized by structural simplicity, ease and economy of manufacture and inherent reliability.

A further aspect of the present invention resides in the ability to variably control the amount of fluid delivered to the second stage element at varying degrees of magnitude of the control signal, thereby achieving, as desired, high or low gain characteristics at the second stage level.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
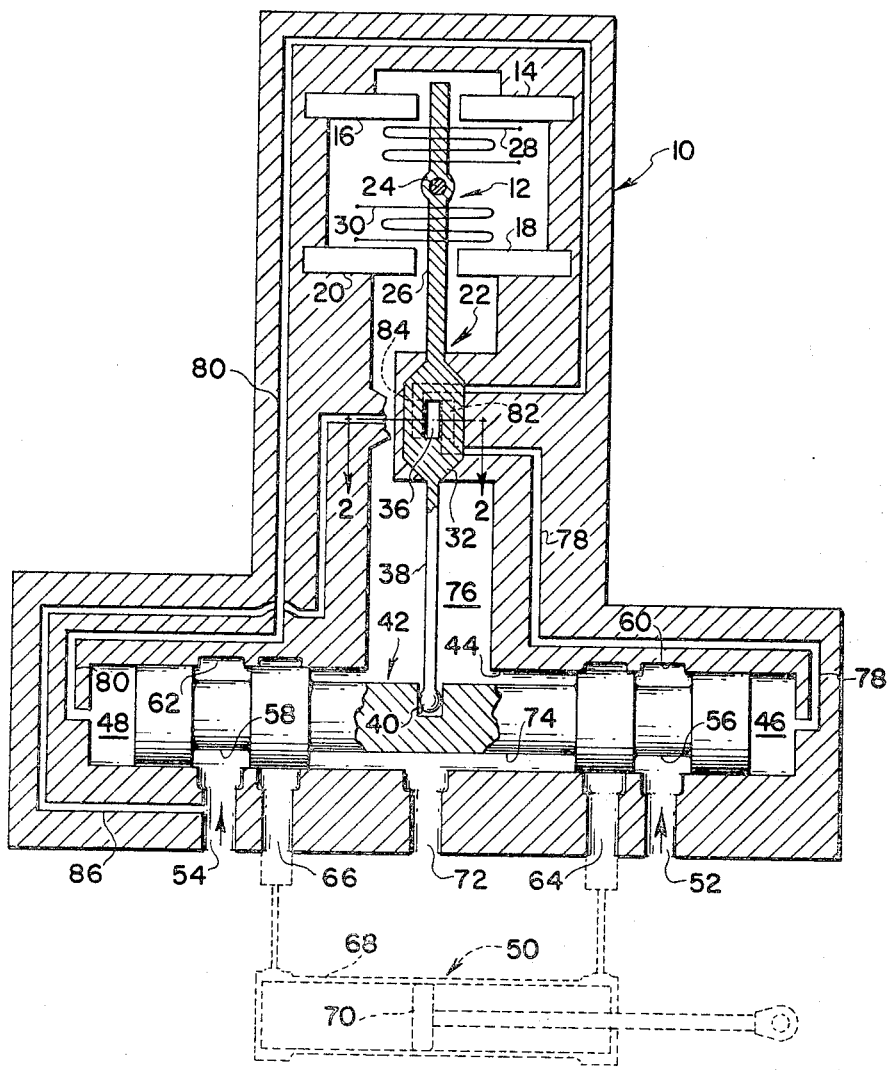
FIG. 1 is a partially diagrammatic, partially sectioned view of the fluid control valve of the present invention.

Referring now in detail to the drawings, wherein like parts are designated by like reference numerals, the fluid control valve of the present invention comprises a valve housing generally indicated at 10 within the upper portion of which is mounted a torque motor assembly generally indicated at 12. The torque motor 12 is of conventional construction and is operatively connected to an electrical control source (not shown) by which it is energized, all in a well-known manner. In the form shown the torque motor comprises an upper pair of permanent magnets 14 and 16 and a lower pair of magnets 18 and 20, the opposed ends of each pair being of opposite polarity and of lateral alignment.

A fluid diverter member generally indicated at 22 is mounted in the upper end of the valve housing by means of a torque rod 24, the latter having opposed ends secured in the housing. The fluid diverter 22 comprises an upper armature portion 26 secured to the torque rod, the armature 26 having associated therewith windings 28 and 30 the terminal ends of which are connected to a conventional control means (not shown) for producing an electrical control signal. In a manner well known, such electrical control signal thereby produces the magnetic flux effecting movement of the armature 26 about the torque rod axis, with the magnitude and direction of such movement being dependent upon the direction and strength of the control signal.

Figures 2, 4, 5:
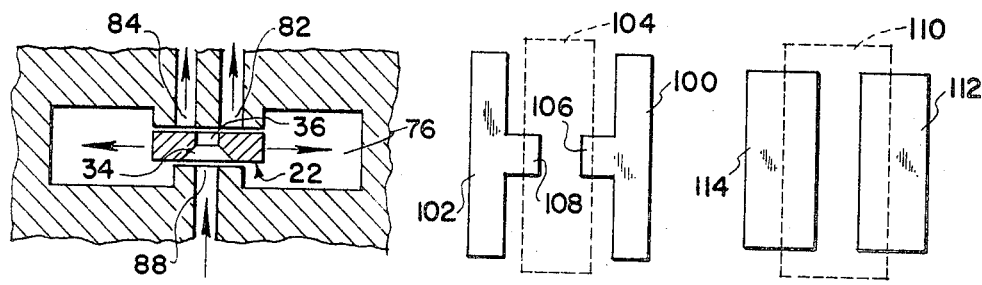
FIG. 2 is an enlarged, fragmentary sectional view taken on line 2—2 of FIG. 1.
FIG. 4 is a diagrammatic view illustrating fluid receiving orifices of different shapes for varying the gain characteristics of the fluid control valve.
FIG. 5 is a diagrammatic illustration of another arrangement of supply and receiver orifice shapes for varying the gain characteristics of the fluid control valve.

The fluid diverter 22 further includes an intermediate, laterally enlarged fluid receiving and directing section 32 having a generally rectangular opening 34 formed therein, as best seen in FIG. 2, such opening being sufficiently large to receive fluid during all positions of adjustment of the diverter and including a discharge orifice 36 which proportionally directs fluid into a pair of stationary receiving passages, as will be hereinafter described.

The fluid diverter element 22 further comprises a preferably integral, relatively thin lower leg portion 38 the extreme end of which is disposed in an opening 40 in a valve spool member generally indicated at 42, the latter being reciprocatingly mounted in a generally cylindrical bore 44 formed in the bottom of the valve housing. The leg portion 38 of the diverter element is flexible to permit relative lateral movement between the upper and intermediate portions of the diverter and the extreme opposite end thereof operatively connected to the valve spool 42.

The opposite end faces of the valve spool 42 define with the respective ends of the bore 44 chambers 46 and 48 to which is delivered fluid under pressure for controlling the position of the valve spool. The valve spool 42 and the fluid diverter 22 are shown in FIG. 1 in their null positions in which substantially equal pressures are maintained in the chambers 46 and 48. It will be apparent, however, that a greater fluid pressure in chamber 46, for example, relative to chamber 48, will effect movement of the valve spool to the left, which movement in turn controls fluid delivery to an external mechanism generally indicated at 50 and adapted to be controlled by the fluid control valve of the present invention. The mechanism 50 forms no part of the present invention, and is intended merely to exemplify one type of mechanism which could be controlled by the valve of the present invention.

For the purpose of controlling fluid flow to the external mechanism 50, the valve spool is formed with a plurality of grooves and the lower portion of the valve housing is formed with a series of supply and control ports. Thus, a pair of supply ports 52 and 54 are formed in the valve housing for supplying fluid under pressure to annular grooves 56 and 58, respectively, formed in the valve spool, with the valve housing being additionally formed with annular recesses 60 and 62 respectively communicating with the grooves 56 and 58 to enhance fluid flow. A pair of control ports 64 and 66 communicate with opposite ends of cylinder 68 of the external mechanism 50, and it will be noted that during the null position of the valve spool (FIGS. 1 and 2), the control ports 64 and 66 are closed whereby a piston 70 within the cylinder 68 is controlled by the fluid pressures then existing at the opposite faces thereof. A return port 72 is formed in the valve housing and communicates with a central, annular groove 74 formed in the valve spool and a fluid chamber 76 centrally formed in the valve housing. The return port 72 serves to return excess fluid not received during the transfer of fluid to the second stage, and fluid forced from the external mechanism 50 to a fluid supply source such as, for example, a fluid reservoir or the like (not shown).

It will be seen that relatively slight movement of the valve spool 42 in either direction will establish fluid communication between either the supply port 52 and the control port 64 or the supply port 54 and the control port 66 for moving the piston 70 of the external device 50. In such position, the control port not communicating with the supply port will be in fluid communication with the return port 72 whereby fluid forced from the cylinder 68 upon movement of the piston 70 will be returned to the reservoir or the like.

Figure 3:
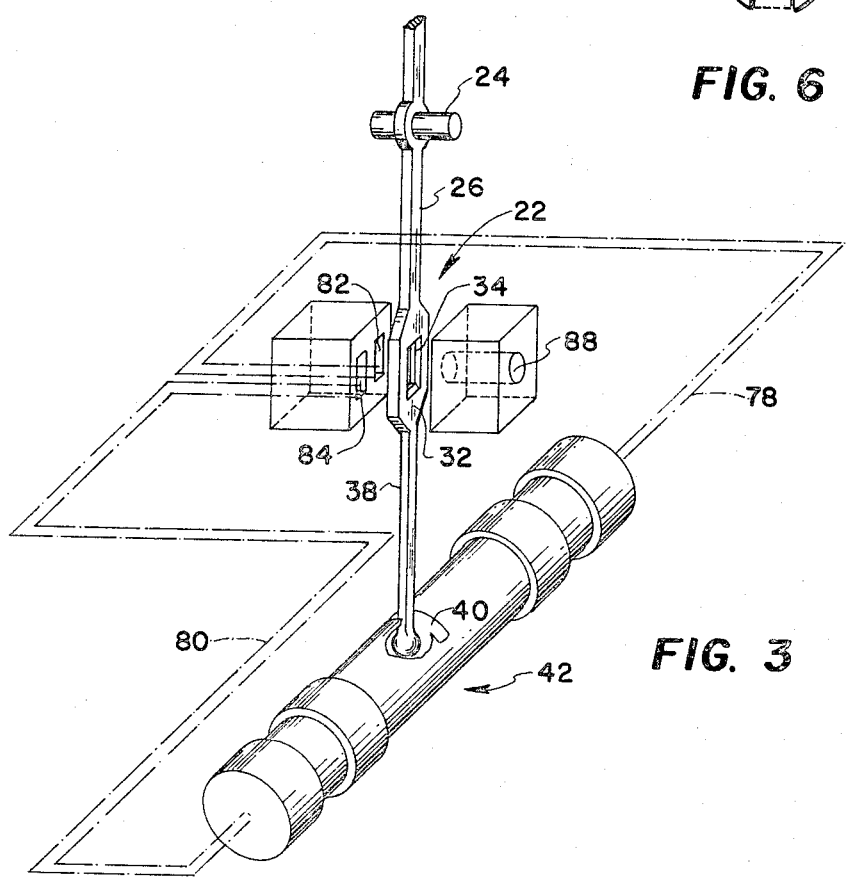
FIG. 3 is a fragmentary, diagrammatic perspective view of the fluid transfer mechanism.

Fluid is delivered to the chambers 46 and 48 by passages 78 and 80, respectively, formed in the valve housing. The opposite ends of such passageways terminate in generally rectangular shaped receiving openings 82 and 84, respectively, disposed generally opposite the discharge orifice 36 of the fluid diverter element 22, as seen in FIG. 2, and shown in perspective in FIG. 3. The fluid diverter 22 is shown in its null position in FIG. 2, and it will be seen that the orifice 36 in such position is symmetrically located relative to the receiving openings 82 and 84.

Fluid is delivered to the fluid diverter 22 through a supply passage 86 formed in the valve housing, one end of which communicates with the supply port 54 and the opposite end of which terminates in a supply opening 88 terminating closely adjacent the opening 34 of the diverter. As previously mentioned, the opening 34 is of sufficient dimension to permit communication between such opening and the stationary supply opening 88 during all operative positions of the fluid diverter.

Referring now to the operation of the fluid control valve, when the fluid diverter is in its null position in the absence of an electric control signal being delivered to the torque motor, the fluid under pressure delivered to supply port 54 flows through the supply passage 86 and opening 88 to the inlet side of the opening 34 of the diverter. The fluid emanating from the diverter discharge orifice 36 flows in substantially equal amounts into the openings 82 and 84 thereby resulting in substantially equal fluid pressures within the passages 78 and 80 and the respective chambers 46 and 48 which communicate therewith. There being no pressure differential existing between the chambers 46 and 48, the valve spool 42 remains in the null position illustrated in FIG. 1. In such position the control ports 64 and 66 are closed thereby maintaining the fluid pressure conditions within the cylinder 68 of the external mechanism 50. The excess fluid not received by the receiving openings 82 and 84 flows downwardly through chamber 76 to port 72 for return to the reservoir.

When the fluid diverter 22 is rotated about the axis of the torque rod 24 in response to an electrical control signal delivered to the torque motor, the discharge orifice 36 of the fluid diverter will move from its symmetrical position relative to the openings 82 and 84 to a position more in alignment with one of the passages relative to the other. Assuming, for example, that the electrical control signal delivered to the torque motor is such as to effect rotation of the diverter 22 counterclockwise about the axis of the torque rod 24, referring to the FIG. 1 orientation thereof, the discharge orifice 36 of the diverter will move toward the receiving opening 82 and thus divert a proportionally greater amount of pressurized fluid to opening 82 relative to opening 84. A relatively greater fluid pressure will thus be built up in passageway 78 relative to passageway 80, and a higher pressure will be created in chamber 46 relative to chamber 48 thereby causing movement of the valve spool 42 to the left, again as viewed in FIG. 1. As will be understood, there is a brief lag between movement of the upper and intermediate portions of the diverter in response to the control signal, and the opposite end thereof which is operatively connected to the valve spool and restrained from movement until the valve spool moves. The relative movement thereby produced is effectively absorbed by the lower portion 38 of the diverter, which is deflected an amount proportional to the control signal. It will also be apparent that the pressure differential in the chambers 46 and 48 will depend upon the respective proportions of fluid received in the receiving openings 82 and 84 which in turn depends upon the direction and magnitude of movement of the fluid diverter as controlled by the electrical control signal delivered to the torque motor.

As the valve spool 42 moves to the left as above described, the control port 64 will be at least partially uncovered thereby providing communication between such control port and the fluid supply port 52. The control port 66 will, however, remain out of communication with the supply port 54 whereby fluid delivered to the control port 64 and to the adjacently disposed end of the cylinder 68 will raise the pressure on that side of the piston relative to the pressure on the other side thereof thereby moving the piston 70 to the left, as viewed in FIG. 1. The fluid forced from the cylinder 68 during such movement of the piston will be directed through the now partially uncovered control port 66 to the return port 72. It will thus be seen that the device to be controlled by the external power mechanism 50 and more particularly by the movement of the piston 70 thereof, is controlled in accurate response to the electrical control signal delivered to the torque motor.

As the valve spool 42 moves to the left, the bottom portion 38 of the fluid diverter 22 will likewise be moved by virtue of the operative connection therebetween. The fluid diverter will thus be biased toward rotation in a clockwise direction about the axis through the torque rod 24, or in a direction opposite to the movement of the diverter in response to the electrical control signal. By virtue of the mounting of the diverter on the torque rod, such biasing responsive to movement of the valve spool will increase the deflection in the lower end portion 38 of the diverter, thereby providing a force further counteracting the force developed by the torque motor. At a certain point of travel, the counteracting torque developed in the deflected end portion 38 of the diverter will exceed the force developed by the torque motor at which time the intermediate and upper portions of the diverter element will be fed back toward a position wherein the discharge orifice 36 thereof closely approaches a symmetrical position relative to the receiving opening 82 and 84. The orifice 36 will slightly overlap the receiving opening 82 to maintain a slight excess of pressure in the chamber 46, such excess being equal to the counteracting torque at the deflected end 38 of the diverter whereby the spool 42 will remain in its adjusted position. It will thus be seen that the fluid directed to the device 50 through control port 64 and flowing from the device 50 to the control port 66 is proportional to the applied control signal.

When the electrical signal to the torque motor is cut off or when such signal is opposite in direction to that originally assumed, the fluid diverter 22 will rotate clockwise about the axis of the torque rod 24. If such movement is in response to a cutting off of the electrical signal, such movement is effected by the torque build-up in the torque rod 24 during previous movement of the diverter element. If the movement is in response to a control signal opposite in direction, the extent of the movement of the fluid diverter will of course depend upon the strength of the control signal fed to the torque motor. In either case, the movement of the fluid diverter will effect movement of the discharge orifice 36 thereof from equal registry with the receiving passages 82 and 84, with the proportionally greater amount of fluid in this instance being diverted to the receiving opening 84. There will thus be a relatively greater pressure build-up in passageway 80 relative to passageway 78 and a greater pressure developed in chamber 48 relative to chamber 46 thereby effecting movement of the valve spool to the right, as viewed in FIG. 1. It will be noted that the initial movement of the fluid diverter clockwise about the axis through the torque rod 24 will tend to relieve the deflection in the flexible lower portion 38 of the diverter, with the subsequent movement of the valve spool 42, if of sufficient magnitude, tending to create deflection of such lower portion in the opposite direction, with the extend of such deflection depending upon the travel of the valve spool as controlled by the magnitude of the control signal. When the force resulting from deflection of the lower end portion 38 exceeds the force of the torque motor, the intermediate and upper portions of the fluid diverter will be fed back, as above described, to a position wherein the discharge orifice 36 thereof is substantially equidistantly spaced from the receiving openings 82 and 84. Equal fluid pressures will then be recreated within the chambers 46 and 48 thereby maintaining the valve spool in its newly adjusted or null position, whichever the case may be.

It will be noted that by virtue of the relatively flat nature of the fluid diverter 22, the fluid flowing transversely therethrough traverses a relatively short flow path, which, together with the relatively close spacing of the supply opening 88 and receiving openings 82 and 84, provides relatively high pressure and flow recovery at the receiving openings. It will further be noted that there are no substantial restrictions in the opening or passages in the described valve construction thereby permitting handling by the valve of fluids containing contaminants of relatively large particle size.

In the invention thus far described, it will be noted that the shapes of the discharge orifice 36 of the fluid diverter 22 and the stationary receiving openings 82 and 84 formed in the valve housing are generally rectangular. Thus, as the discharge opening 36 moves toward and eventually overlies either part or all of either of the receiving openings 82 or 84 dependent upon the direction and magnitude of the control signal, the fluid directed to such receiving opening is directly proportional to the degree of movement of the diverter element. This creates a linear gain condition wherein the amount of fluid directed to the receiving opening is a linear function of the movement of the discharge opening 36, which is, of course, dependent upon the input signal delivered to the torque motor. In such a linear arrangement, the fluid delivered by the valve, i.e. the fluid directed by the second stage to the external power mechanism 50, in relation to the fluid directed to the fluid diverter element 22, is directly proportional to the control signal.

It will be appreciated that there may be instances where it is desirable to direct the fluid to the second stage in a non-linear manner, i.e. in a manner that is not linearly proportional to the magnitude of the input signal delivered to the torque motor. Such an arrangement is shown in FIG. 4, wherein there is diagrammatically illustrated in enlarged form stationary receiver openings 100 and 102 comparable to the openings 82 and 84 above described, and movable discharge orifice 104, the latter being comparable to the discharge orifice 36 of the movable fluid diverter element 22 described above. The receiving openings 100 and 102 are provided with laterally inwardly extending side portions 106 and 108, respectively, which partially overlie the discharge orifice 104 when the latter is in its illustrated null position. It will be seen that during such null position, only a relatively small amount of the fluid emanating from the discharge orifice 104 will be received in the side portions 106 and 108 of the receiving openings. Moreover, it will be seen that even with movement of the discharge orifice 104 in a direction toward the main portion of receiving opening 100 in response to the applied control signal, the additional fluid received by lateral portion 106 of the opening 100 will still comprise a relatively small portion of the total fluid emanating from the discharge orifice 104. It is only when the discharge orifice 104 overlies the relatively long, main receiving portion of the receiving opening 100 that the latter begins to receive a proportionately greater amount of the fluid emanating from the discharge orifice 104. Such an arrangement is thus characterized by a relatively low gain near null position, and a relatively high gain at greater degrees of travel of the discharge orifice 104. The term gain is well known in the art and refers to the variation in output flow or pressure with input signal.

In FIG. 5 there is shown a movable rectangular discharge orifice 110 and stationary rectangular receiver openings 112 and 114, being similar in this respect to the discharge orifice 36 and receiver openings 82 and 84 above described. However, in the FIG. 5 form the discharge opening 110 is of relatively large width and during the null position illustrated substantially overlaps both receiver openings 112 and 114. This arrangement provides a high gain, i.e. the fluid flow to the second stage is relatively high when the discharge orifice 110 is relatively near null in response to a relatively small input signal. Such a high gain characteristic enhances the accuracy of the system.

Figure 6:
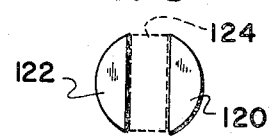
FIG. 6 is another diagrammatic illustration of variable shaped receiving orifices for variably controlling the gain of the fluid control valve.

There is shown in FIG. 6 a further arrangement or configuration of the discharge and receiving openings. In this form, the stationary receiving openings 120 and 122 are generally D-shaped, with the respective base portions thereof being disposed adjacent the movable discharge orifice 124, when the diverter is in its null position illustrated. Movement of the discharge orifice 124 toward the receiving opening 122, for example, will effect an overlying by the discharge opening of a relatively large portion of the receiving opening, with relatively small movement of the discharge orifice 124, with further movement thereof effecting a progressive overlying of the smaller portion of the receiver opening. There is thus provided a relatively high gain near null, and a progressively lower gain as the discharge orifice moves away from the null position.

Although in the various combinations above described for varying the relationship between fluid delivered to the second stage element, the discharge orifices are disclosed as movable, and the shape of the receiving openings varied to provide the desired results, it will be apparent that the concept is much broader in application. For example, the discharge orifice could be varied in shape rather than, or in addition to, the receiving openings to produce the desired result.

It will thus be seen that the fluid control valve of the present invention is novel in many respects. In the preferred form of the invention, the fluid diverter 22 functions to divert fluid to the second stage element in proportional amounts in response to the control signal. The present invention also discloses, however, a means for varying the gain at the second stage level through provision of various shaped receiving openings. The novel diverter member includes a flexible lower end portion which automatically feeds back or repositions the diverter responsive to movement of the valve spool thereby maintaining the latter in its adjusted position. The diverter and feedback are integrally constructed and thus provide an arrangement which is inherently reliable. The discharge orifice of the diverter is located relatively remote from the torque motor controlling movement of the diverter, with the torque motor thereby being relatively insensitive to fluid temperature conditions existing at the diverter orifice, which temperatures depend upon the application or use of the valve and the fluid being handled. The control valve further provides a high level of contamination tolerance thereby greatly improving valve dependability.

Other modes of applying the principle of the invention may be employed, change being made as regards the details described, provided the features stated in any of the following claims or the equivalent of such be employed.

I therefore particularly point out and distinctly claim as my invention:

1. A fluid control valve comprising a valve housing, a valve spool mounted in said valve housing for regulating fluid flow to an external mechanism, the opposite ends of said valve spool defining with said valve housing a pair of chambers adapted to receive fluid under pressure for controlling the position of said valve spool, a fluid diverter member movably mounted adjacent one end in said housing, control means associated with said one end of said diverter for moving said diverter responsive to a control signal, said diverter having an integral, opposite end portion operatively connected to said valve spool for movement therewith, said diverter being formed with an opening for receiving fluid and directing the same in a direction generally normal to the plane of motion of said diverter, a supply passage formed in said housing for supplying fluid under pressure to said opening in said diverter, a pair of receiving passages formed in said housing generally opposite from said diverter opening, each of said passages being equidistantly spaced from said opening in said diverter during the null position of the latter, each of said receiving passages communicating with a respective chamber for delivering fluid under pressure thereto, said control means varying the position of said diverter for supplying variable amounts of fluid under pressure to said receiving passages and associated chambers for controlling the position of said valve spool, movement of said valve spool producing movement of the lower end of said diverter thereby effecting a repositioning of said diverter relative to said receiving passages for maintaining the valve spool in its adjusted position.

2. The combination of claim 1 wherein said opening in said diverter element is rectangular and each of said receiving passages has a generally rectangular main fluid receiving portion and a laterally inwardly directed side portion, the rectangular opening in said diverter during the null position of the latter overlying said side portions of said receiving passages.

3. The combination of claim 1 wherein said opening in said diverter is generally rectangular and said receiving passages are generally D-shaped having base portions disposed toward said diverter opening, the rectangular opening in said diverter during the null position of the latter being slightly spaced from said base portions of said receiving passages.

4. A fluid control valve comprising a valve housing, a valve spool mounted in said valve housing for regulating fluid flow to an external mechanism, the opposite ends of said valve spool defining with said housing a pair of chambers adapted to receive fluid under pressure for controlling the position of said valve spool, a diverter member movably mounted in said housing, control means associated with one end of said diverter for moving said diverter responsive to a control signal, the opposite end of said diverter being associated with said valve spool for movement therewith, a supply passage formed in said housing for supplying fluid under pressure to said diverter, a pair of receiving passages formed in said housing adapted to receive variable amounts of fluid from said diverter, with said receiving passages communicating with a respective chamber for delivering fluid under pressure thereto, said control means varying the position of said diverter for supplying variable amounts of fluid under pressure to said chambers for controlling the position of said valve spool, with movement of said valve spool repositioning said diverter for maintaining the valve spool in its adjusted position.

5. A two-stage fluid control valve comprising a valve housing, a valve spool mounted in said valve housing for regulating fluid flow to an external mechanism, the opposite ends of said valve spool defining with said valve housing a pair of chambers adapted to receive fluid under pressure for controlling the position of said valve spool, a fluid diverter member movably mounted adjacent one end in said housing, said diverter being formed with a generally funnel-shaped opening for receiving fluid and directing the same in a direction generally normal to the plane of motion of said diverter, a supply passage formed in said housing for supplying fluid under pressure to said opening in said diverter, a pair of receiving passages formed in said housing generally opposite from said diverter opening, each of said passages being equidistantly spaced from said opening in said diverter during the null position of the latter, each of said receiving passages communicating with a respective chamber for delivering fluid under pressure thereto, control means associated with said one end of said diverter for moving said diverter responsive to a control signal, mechanical feedback means comprising the sole feedback for returning said diverter to a neutral position following movement thereof in response to said control means, said mechanical feedback means comprising a flexible leg integrally formed with said diverter, the bottom of said leg being operatively connected to said valve spool for movement therewith, said control means varying the position of said diverter for supplying variable amounts of fluid under pressure to said receiving passages and associated chambers for controlling the position of said valve spool, movement of said valve spool producing movement of said flexible leg of said diverter thereby effecting a repositioning of said diverter relative to said receiving passages for maintaining the valve spool in its adjusted position.

6. The combination of claim 5 wherein said diverter opening is generally rectangular in cross-section and wherein said receiving passages are non-rectangular in cross-section thereby to provide a non-linear gain in the second stage of said two-stage valve.

References Cited

UNITED STATES PATENTS 2,947,286    8/1960    Baltus _____ 91—365
3,223,103   12/1965    Trinkler _____ 91—3 X ALAN COHAN, *Primary Examiner.*